(12) United States Patent
Thurber et al.

(10) Patent No.: US 7,552,269 B2
(45) Date of Patent: Jun. 23, 2009

(54) SYNCHRONIZING A PLURALITY OF PROCESSORS

(75) Inventors: Steven Mark Thurber, Austin, TX (US); Andrew Henry Wottreng, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 11/622,299

(22) Filed: Jan. 11, 2007

(65) Prior Publication Data

US 2008/0172507 A1 Jul. 17, 2008

(51) Int. Cl.
*G06F 13/00* (2006.01)

(52) U.S. Cl. .......................... 710/313; 713/375

(58) Field of Classification Search .................. 713/375; 710/313, 105, 305, 306
See application file for complete search history.

(56) References Cited

U.S. PATENT DOCUMENTS 7,454,551 B2 * 11/2008 Myers ........................ 710/310

| | | | |
|---|---|---|---|
| 2005/0120163 A1* | 6/2005 | Chou et al. | 711/103 |
| 2006/0179255 A1* | 8/2006 | Yamazaki | 711/147 |
| 2006/0277347 A1* | 12/2006 | Ashmore et al. | 710/313 |
| 2008/0112313 A1* | 5/2008 | Terakawa | 370/229 |

* cited by examiner

*Primary Examiner*—Glenn A Auve
(74) *Attorney, Agent, or Firm*—Dugan & Dugan, PC

(57) ABSTRACT

In a first aspect, a first method of synchronizing a plurality of processors of a system is provided. The first method includes the steps of (1) modifying a peripheral component interconnect express (PCIe) protocol to include a completion status encode associated with a synchronization command that indicates whether a condition of the synchronization command is met; (2) providing a system including (a) a memory; (b) a first processor coupled to the memory; (c) a second processor; and (d) an interconnect coupling the second processor to the first processor and the memory; and (3) employing the modified PCIe protocol on the interconnect. Numerous other aspects are provided.

21 Claims, 2 Drawing Sheets

SYNCHRONIZING A PLURALITY OF PROCESSORS

FIELD OF THE INVENTION

The present invention relates generally to computer systems and more particularly to methods and apparatus for synchronizing a plurality of processors.

BACKGROUND

A conventional computer system may include an input/output (I/O) device coupled to a main processor and a memory via a peripheral component interconnect express (PCIe) interconnect. Such a computer system may include accelerator logic coupled to the PCIe interconnect. The accelerator logic may include or be a special processor adapted to perform one or more specific functions. However, the PCIe interconnect in a conventional system may only be adapted to process read and/or write commands (e.g., from the accelerator logic). To wit, the PCIe is not adapted to process more complex commands, such as read-modify-write commands which may be employed, for example, to synchronize the accelerator logic and main processor so the accelerator logic and main processor may efficiently execute different functions of a program. Accordingly, improved methods and apparatus for employing a PCIe interconnect are desired.

SUMMARY OF THE INVENTION

In a first aspect of the invention, a first method of synchronizing a plurality of processors of a system is provided. The first method includes the steps of (1) modifying a peripheral component interconnect express (PCIe) protocol to include a completion status encode associated with a synchronization command that indicates whether a condition of the synchronization command is met; (2) providing a system including (a) a memory; (b) a first processor coupled to the memory; (c) a second processor; and (d) an interconnect coupling the second processor to the first processor and the memory; and (3) employing the modified PCIe protocol on the interconnect.

In a second aspect of the invention, a first apparatus for synchronizing a plurality of processors of a system is provided. The first apparatus includes (1) an interconnect adapted to couple to a first processor and a memory; (2) a second processor coupled to the interconnect. The interconnect employs a modified version of a peripheral component interconnect express (PCIe) protocol that includes a completion status encode associated with a synchronization command indicating whether a condition of the synchronization command is met.

In a third aspect of the invention, a first system for synchronizing a plurality of processors is provided. The first system includes (1) a memory; (2) a first processor coupled to the memory; (3) a second processor; and (4) an interconnect coupling the second processor to the first processor and the memory. The interconnect employs a modified version of a peripheral component interconnect express (PCIe) protocol that includes a completion status encode associated with a synchronization command indicating whether a condition of the synchronization command is met. Numerous other aspects are provided, as are systems and apparatus in accordance with these other aspects of the invention.

Other features and aspects of the present invention will become more fully apparent from the following detailed description, the appended claims and the accompanying drawings.

DETAILED DESCRIPTION

The present invention provides improved methods and apparatus for employing a PCIe interconnect. More specifically, the present invention may modify the PCIe protocol such that an interconnect employing such a protocol may process (in part) a read-modify-write command. For example, the present invention may modify the PCIe protocol to include a new transaction type corresponding to the read-modify-write command so an interconnect employing the protocol may recognize that type of command. Further, the present methods and apparatus may introduce a new completion status encode that indicates whether a condition is met when processing the read-modify-write command. For example, for a compare-and-swap command, the completion status encode may indicate whether the first and second operands are equal. For a test-and-set command, the completion status encode may indicate whether a first value has a first or second state.

Further, the present invention may include I/O bridge logic adapted to read data from the memory, modify the read data, and write the modified data to the memory while processing the read-modify-write command. In this manner, the data read from the memory may not be transmitted to the PCIe interconnect and/or the accelerator logic. Thus, the accelerator logic is not burdened with such processing. However, while processing a read-modify-write command, the completion status encode may be transmitted to the PCIe interconnect. The accelerator logic may be adapted to detect and employ the completion status encode to quickly determine whether the synchronization command was successful. In this manner, the present invention may provide improved methods and apparatus for employing a PCIe interconnect. More specifically, the present invention may provide synchronization of processors in a system (e.g., a main processor and accelerator logic coupled to a PCIe interconnect) without requiring data read from a memory to be transmitted to the PCIe interconnect and/or accelerator logic.

Examples of read-modify-write commands include a compare-and-swap command and a test-and-set command. During a compare-and-swap command, a first operand, which may be a register address, may be compared to a second operand, which may be a memory location. If the first and second operands are equal, a third operand may be written to the memory location indicated by the second operand. Alternatively, if the first and second operands are not equal, the value stored in the memory location indicated by the second operand may be written to the register address indicated by the first operand. In a test-and-set command, a state of a first value may be tested, and a state of a second value may be set based on the result of the test.

Figure 1:
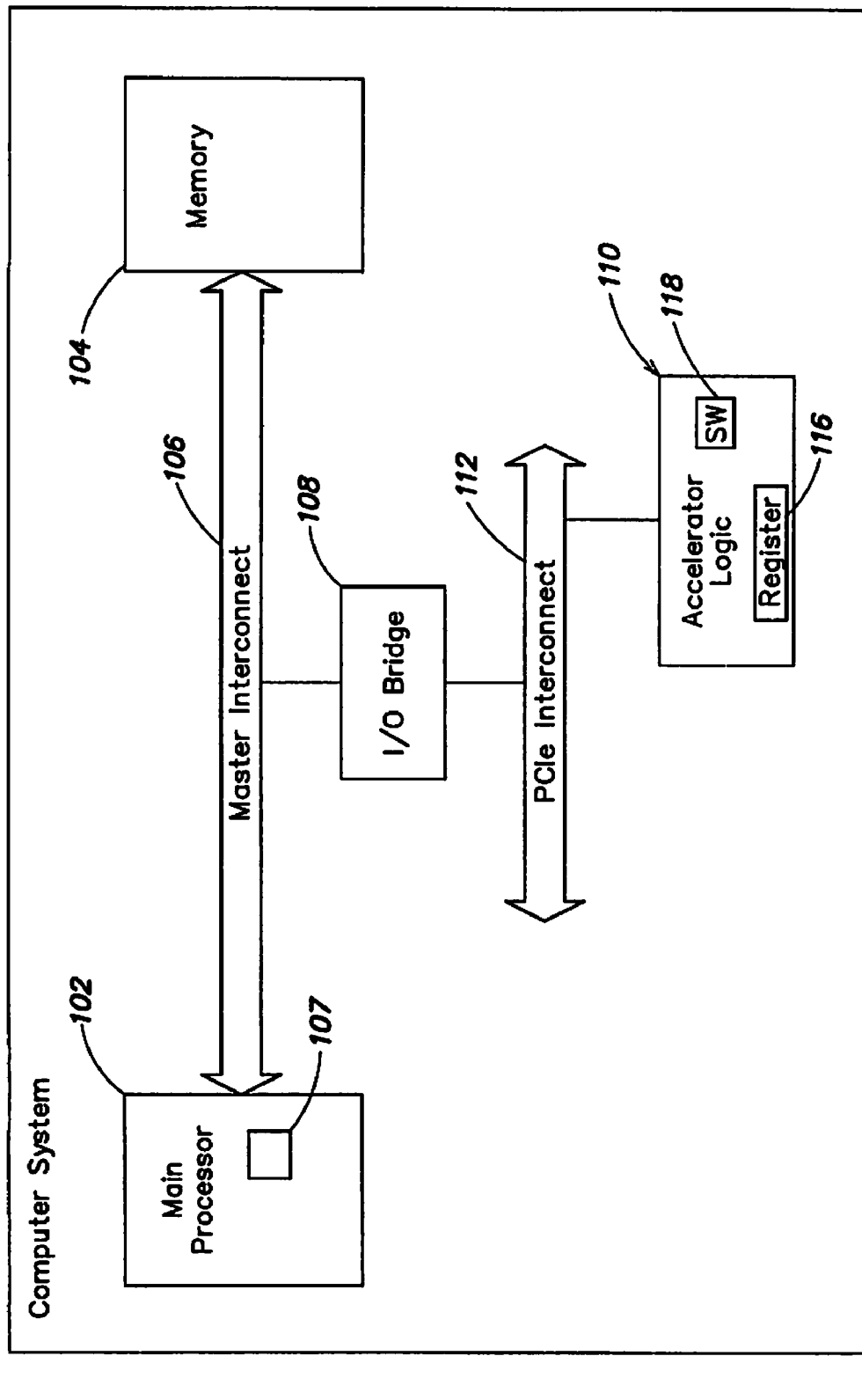
FIG. 1 is a block diagram of a system for synchronizing a plurality of processors in accordance with an embodiment of the present invention.

FIG. 1 is a block diagram of a system for efficiently employing a PCIe interconnect in accordance with an embodiment of the present invention. With reference to FIG. 1, the system 100 may be a computer or similar device. The system 100 may include a first processor 102, such as a main processor, coupled to a memory 104 via a first interconnect 106, such as a master interconnect. The first processor 102 may be adapted to execute code 107, read data from and/or write data to the memory 104 via the master interconnect 106. The system 100 may include command processing logic 108 coupled to the master interconnect 106. The command processing logic 108 may be an input/output (I/O) bridge or another suitable device. Additionally, the system 100 may include a second processor 110 coupled to command processing logic 108 via a second interconnect 112. The second processor 110 may be accelerator logic adapted to perform (e.g., efficiently) one or more specific functions (e.g., encryption). For example, the second processor 110 may be adapted to issue a command on the interconnect associated with the one or more specific functions. The command processing logic 108 may detect such command on the second interconnect 112, and in response, may perform a large part of the processing associated with the command. Therefore, the command processing logic 108 may serve as an agent for the second processor 110. In some embodiments, the system 100 may include one or more I/O devices (only one shown) 114, such as a disk drive coupled to the second interconnect 112.

In a system 100 that includes a plurality of processors 102, 110, the processors 102, 110 may perform better if the processors 102, 110 are synchronized. Synchronization may include awareness by each processor 102, 110 of functions performed by one or more remaining processors 102, 110 of the system 100. Such coordination may enable the processors 102, 110 to efficiently perform their respective functions of one or more applications executed by the system 100. For example, synchronization may enable the plurality of processors 102, 110 to efficiently access shared data. An atomic (e.g., indivisible) combined command to read data from the memory, modify the read data and write the modified data to the memory (e.g., a read-modify-write command) may be employed to synchronize the processors 102, 110. However, a conventional interconnect protocol (e.g., peripheral component interconnect express (PCIe)) only supports accelerator logic that only performs read or write commands and does not support logic that performs such a synchronization command. Consequently, processors in a system employing such a conventional interconnect protocol may not be synchronized, and therefore, may not be efficient.

Thus, the second interconnect 112 of the system 100 may be adapted to employ a modified version of the PCIe protocol. The modified PCIe protocol may include and/or recognize a new transaction type corresponding to the synchronization command. Further, the modified version of the PCIe protocol may include a new completion status encode associated with a synchronization command that indicates whether a condition (described below) of the synchronization command is met. During operation, the second processor 110, which may be connected to the second interconnect 112, may issue a synchronization command on the second interconnect 112. The synchronization command may include one or more steps to determine whether a condition is met. For example, the synchronization command may include one or more steps in which two operands are compared to determine whether the operands are equal. Based on the comparison, a subsequent action may be performed. Alternatively or additionally, the synchronization command may include one or more steps in which a state of a first value (e.g., one or more bits) is determined, and a second value may be set based on the state of the first value. The above-described conditions are exemplary, and therefore, the synchronization command may include one or more steps in which a different condition is determined. The command processing logic 108, which is coupled to the second interconnect 112, may be adapted to detect the synchronization command on the second interconnect 112. Further, based on the synchronization command, the command processing logic 108 may be adapted to perform the processing associated with the synchronization command on the second interconnect 112. For example, the command processing logic 108 may read data from the memory 104, modify the read data, and write the modified data back to the memory 104. Because the command processing logic 108 performs the processing, the command processing logic 108 may not transmit the data read from the memory 104 to the second processor 110. Because such data is not transmitted from the memory 104 to the second processor 110, the system 100 may process the command more efficiently. However, when the command processing logic 108 completes processing the synchronization command, the command processing logic 108 may transmit a status of the command back to the second interconnect 112. The status may be a command completion encode that indicates, for example, whether the command completed successfully. More specifically, a first command completion encode may indicate the synchronization command completed successfully without meeting the condition tested for. Alternatively, a second command completion encode may indicate the synchronization command completed successfully and the condition was met. For example, the first command completion encode may be "000b", and the second command completion encode may be "110b" (although a different encode may be employed for the first and/or second encode). Further, a larger number of encodes may be employed to indicate different command completion statuses, respectively. For example, another encode may be employed to indicate a request is unsupported.

The second processor 110 may detect such status on the second interconnect 112. Subsequent processing of one or more commands may be based on the command status from the command processing logic 108. For example, the second processor 110 may include logic 116 adapted to store data, such as a condition register. The second processor 110 may store a first value in such logic 116 while the synchronization command is pending. However, when the synchronization command completes, the logic 116 may store a second value (e.g., based on the first or second command completion encode). By accessing the data in the storage logic 116, the second processor (e.g., software 118 executed thereby) may quickly determine whether the synchronization command completed successfully and/or whether the condition tested for during one or more steps of the synchronization command is met.

Thus, the modified PCIe protocol employed by the second interconnect 112 may enable a processor, such as accelerator logic, coupled and/or connected to the second interconnect 112 to perform a synchronization command, which enables a plurality of processors included in the system 100 to efficiently execute respective functions. The system 100 may efficiently process the synchronization command. More specifically, although the second processor 110 issues the synchronization command, much of the processing associated with the synchronization command may be performed by the command processing logic 108. Therefore, an amount of data transmitted to the second processor 110 as part of the synchronization command may be reduced. For example, data read from the memory as part of the synchronization command may not be transmitted to the second processor 110.

Figure 2:
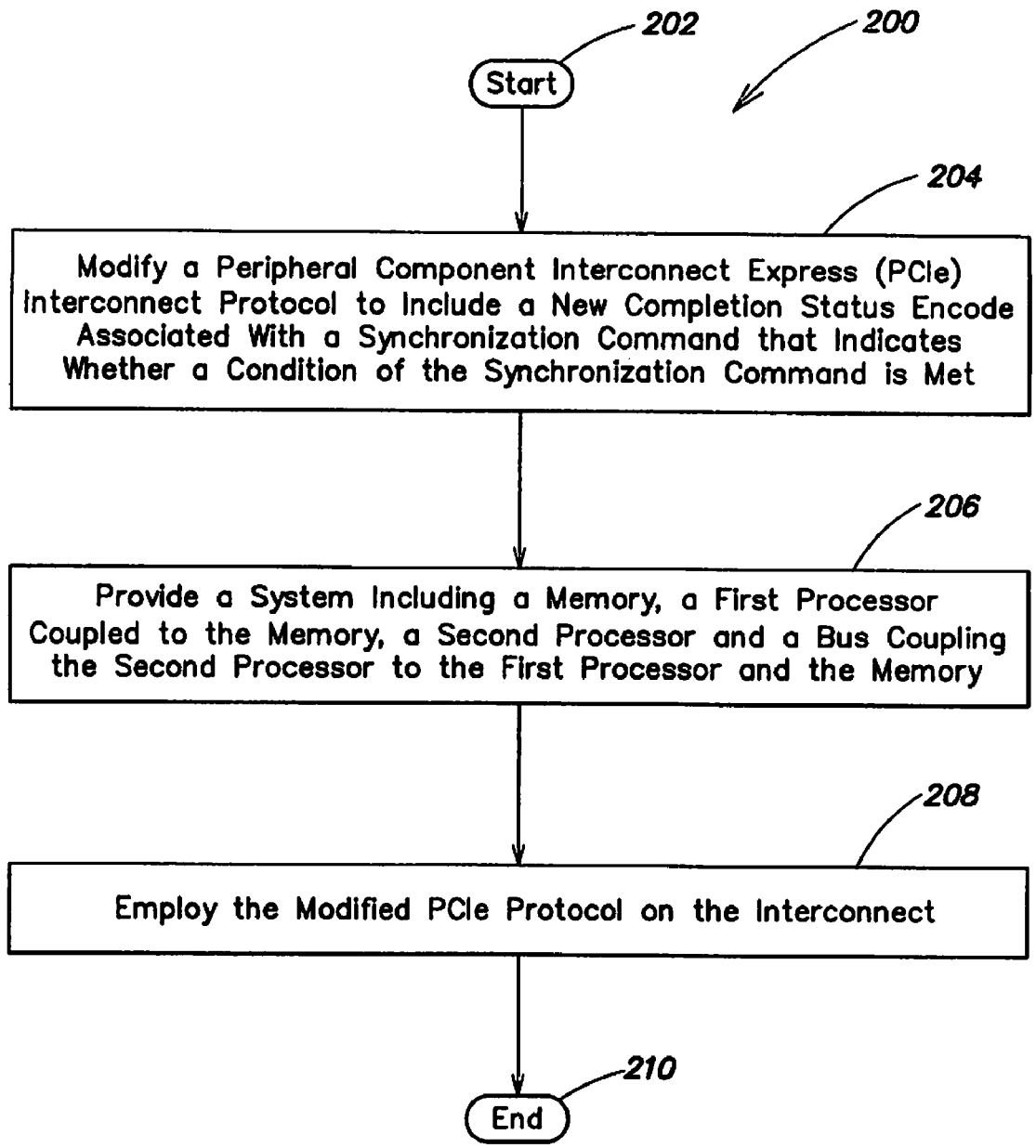
FIG. 2 illustrates a method of synchronizing a plurality of processors in accordance with an embodiment of the present invention.

FIG. 2 illustrates a method 200 of synchronizing a plurality of processors in accordance with an embodiment of the present invention. With reference to FIG. 2, in step 202, the method 200 begins. In step 204, a peripheral component interconnect express (PCIe) protocol may be modified to include a new completion status encode associated with a synchronization command that indicates whether a condition of the synchronization command is met. For example, an existing PCIe protocol may be modified to include a transaction type corresponding to the synchronization command, which may be an indivisible read-write-modify command (although the synchronization command may be a different type of command). Because such a command is indivisible, if two processors are performing a compare-and-swap command requiring access to the same second operand which indicates a memory location, the read, compare and write step performed by one processor may all effectively complete before any of the read, compare and write steps are started for the other processors. Such a transaction type may enable an interconnect 112 employing the modified PCIe protocol to recognize a synchronization command. Additionally or alternatively, the existing interconnect protocol may be modified to include one or more command completion encodes each of which indicates whether a command completed successfully and whether a condition tested for during one or more steps of the synchronization command is met. More specifically, a first command completion encode may indicate a synchronization command completed successfully without meeting the condition tested for. Similarly a second command completion encode may indicate a synchronization command completed successfully and the condition tested for was met. However, the PCIe protocol may be modified to include a larger or smaller number of command completion encodes.

In step 206, a system 100 including a memory 104, a first processor 102 coupled to the memory 104, a second processor 110, and an interconnect 112 coupling the second processor 110 to the first processor 102 and to the memory 104 may be provided. The system 100 may also include one or more I/O devices 114 (only one shown) coupled to the second interconnect 112 through which the processors 102, 110 may access the I/O devices 114. The first processor 102 may be coupled to the memory 104 via a first interconnect 106, such as a master interconnect. The first processor 102 may be a main processor adapted to execute code, read data from and/ or write data to the memory 104. Further, the system 100 may include command processing logic 108 coupled to the first and second interconnects 106, 112. The command processing logic 108 may serve as an I/O bridge through which the one or more I/O devices 114 may be accessed. The second processor 110 may be accelerator logic, which may be adapted to improve the overall efficiency with which the processors 102, 110 execute commands. For example, the second processor 110 may be adapted to perform one or more specific functions. By performing such specific functions, the second processor 110 may remove some of the processing burden from the first processor 102. Additionally, the second processor 110 may be adapted to issue a command to synchronize the plurality of processors included in the system 100. Exemplary synchronization commands are described below. The command processing logic 108 may be adapted to detect a synchronization command issued on the second interconnect 112, perform processing associated with the synchronization command, and transmit data indicating a command completion status on the second interconnect 112. The second processor 110 may include logic 116 adapted to store data based on such command completion status. Because the command processing logic 108 performs much of the processing associated with the synchronization command, the system 100 may execute the command more efficiently than if the second processor 110 performed the processing associated with the synchronization command.

In step 208, the modified PCIe protocol may be employed on the second interconnect 112. Because the modified PCIe protocol includes a transaction type corresponding to the synchronization command, the second interconnect 112 may recognize a synchronization command. Therefore, a processor 110, such as accelerator logic, coupled and/or connected to the second interconnect 112 may issue a synchronization command that may make each processor 102, 110 of the system 100 aware of functions performed by one or more remaining processors 102, 110 of the system 100. Such coordination may enable the processors 102, 110 to efficiently perform their respective functions corresponding to one or more applications executed by the system 100. For example, the synchronization command may enable processors 102, 110 of the system 100 to process commands requiring access to shared memory more efficiently.

As described above, the synchronization command may be an indivisible command to read data from a memory location, modify the read data, and write the modified data to the same memory location. Assume the synchronization command is a compare-and-exchange or compare-and-swap command. During operation, the second processor 110 may issue such a command to synchronize a plurality of processors 102, 110 of the system 100. Thus, the accelerator logic may perform the synchronization transaction at the PCIe interconnect level. For example, the second processor 110 may issue a first and second operand to the command processing logic 108 via the second interconnect 112. The first operand may be an address of a register included in the system 100 and the second operand may be data to be stored. Thus, the transaction may look like a write command because data consisting of a first and second operand may be passed via the second interconnect 112 to the command processing logic 108 (which may be in the main processor domain).

During the compare-and-exchange command, the first operand may be compared to a third operand, which may be an address or location in the memory 104. If the first and third operands are equal, the second operand may be written to the memory location indicated by the third operand. Alternatively, if the first and third operands are not equal, data stored in the memory location indicated by the third operand may be written to the register address indicated by the first operand. During the compare-and-exchange command, the command processing logic 108 may read data (e.g., from the memory 104), modify the read data and/or conditionally write the modified data. Thus, the agent of the second processor 110 does the atomic read, comparison and write, if operands are equal. The read data may not be transmitted to the second interconnect 110. Thus, the present invention may avoid the need to return an operand (e.g., the first operand) to the second interconnect 112. However, upon execution of the compare-and-exchange command, the command processing logic 108 may inform the second processor 110 of the status of the command via the second interconnect 112. Thus, the agent passes back status to the second processor 110 indicating (among other things) the result of the comparison, and therefore, whether the second operand is written to the third operand. For example, the command processing logic 108 may transmit a command completion encode which serves to indicate the status of the command. If the command processing logic 108 successfully completes the command and determines the first and third operands are equal while executing the command, the command processing logic 108 may transmit a first command completion encode (e.g., "000b") indicating such. Alternatively, if the command processing logic 108 successfully completes the command and determines the first and third operands are not equal while executing the command, the command processing logic 108 may transmit a second command completion encode (e.g., "110b") indicating such.

As long as software executed by the main processor 102 (e.g., CPU) does not depend on the data stored in the third operand being written to the first operand when the operands are unequal, software 103 executed by the main processor 102 and software 118 executed by the second processor 110 may have essentially the same synchronization primitive (e.g., instructions). Although this primitive may be a subset of the original compare-and-swap command, the instruction may still be a useful and fast mechanism.

The present invention may provide such a synchronization command using a greatly simplified PCIe implementation (e.g., with minimal modifications to a conventional PCIe protocol). Such synchronization operation may be similar to a non-posted write command (e.g., a command in which a status is returned to the processor that issued the command). Therefore, existing PCIe protocol ordering rules and flow control may apply. Further, the modified PCIe protocol may be supported by existing interconnects. More specifically, the modified PCIe protocol may be employed by an interconnect without requiring modification to PCIe switches.

The second processor 110 may process subsequent commands based on the command status provided by the command processing logic 108. For example, in some embodiments, the second processor 110 may store a value based on the command status (e.g., a converted version thereof) in storage logic 116 coupled thereto and/or included therein. Until such a value based on a command status indicating successful completion of the synchronization command is written or returned to the logic 116, the logic 116 may be empty, and the second processor 110 may stall (e.g., via interlock mechanisms included therein) issuance, and therefore, execution of subsequent commands on the second interconnect 112. The second processor 110 (e.g., software executed thereby) may read data stored in the logic 116 to determine the result of the PCIe synchronization transaction. Alternatively, in other embodiments, the second processor 110 may store a temporary value indicating that the status of the synchronization command is "in progress" while the system 100 processes the command. When the command completes, a value indicating such completion may be stored in the logic 116. In this manner, the second processor 110 (e.g., software executed thereby) may poll the logic 116 to determine a status of a synchronization command. Issuance of commands from other processors 102, 112 in the system 100 may be based on the synchronization command completion status provided by the command processing logic 108. For example, the first processor 102 may delay a command that may require access to the same memory location as the synchronization command until the command processing logic 108 provides a synchronization command completion status that indicates the synchronization command completed successfully.

As a further example, assume the synchronization command is a test-and-set command. During operation, the second processor 110 may issue such a command to synchronize a plurality of processors 102, 110 of the system 100. For example, the second processor 110 may issue a command to test a state of data stored in a memory location. In response, the command processing logic 108 may read the data from a memory location. If the data is of a first state, e.g. the most significant bit is equal to 0, the command processing logic 108 may update such data so it is of a desired state, e.g. set the byte to all ones, and write the updated data back to the memory 104. Alternatively, if the data read from a memory location is not of the first state, the command processing logic 108 may not update the data stored in the memory location. During the test-and-set command, the data read from the memory location may not be transmitted to the second interconnect 112. However, upon execution of the test-and-set command, the command processing logic 108 may inform the second processor 110 of the status of the command via the second interconnect 112. For example, the command processing logic 108 may transmit a command completion encode which serves to indicate the status of the command. If the command processing logic 108 successfully completes the command and determines the data read from the memory location is of a first state while executing the command, the command processing logic 108 may transmit a first command completion encode (e.g., "000b") indicating such (e.g., to the second interconnect 112). Alternatively, if the command processing logic 108 successfully completes the command and determines the data stored in the memory location is not of a first state while executing the command, the command processing logic 108 may transmit a second command completion encode (e.g., "110b") indicating such. As described above, issuance of a subsequent command from one or more of the processors 102, 110 may be based on the command completion status provided by the command processing logic 108.

Although system processing of two exemplary commands is described above, the system 100 may be adapted to process different types of commands, such as an atomic add (e.g., in-memory add) command, atomic increment command, or the like, in a similar manner. During an atomic add, data may be read from a memory location, the data may be modified by adding a value to such data, and the modified data may be written to the memory location. Such steps are combined and indivisible. For example, when the second processor 110 issues an atomic add command on the second interconnect 112, the command processing logic 108 may read the data from memory, modify the data and write the data to the memory as described above. Further, upon completion of the command, the command processing logic 108 may transmit a command completion encode to the second interconnect 112 which indicates a command completion status of the atomic add command. Issuance of a subsequent command from one or more of the processors 102, 110 may be based on the command completion status provided by the command processing logic 108.

During an atomic increment command, data may be read from a memory location, the data may be modified by adding a unit (e.g., a logic "1") to such data, and the modified data may be written to the memory location. Such steps are combined and indivisible. For example, when the second processor 110 issues an atomic increment command on the second interconnect 112, the command processing logic 108 may read the data from the memory location, modify the data and write the data to the memory location as described above. Further, upon completion of the atomic increment command, the command processing logic 108 may transmit a command completion encode to the second interconnect 112 which indicates a command completion status of the atomic increment command. Issuance of a subsequent command from one or more of the processors 102, 110 may be based on the command completion status provided by the command processing logic 108.

Thereafter, step 210 may be performed. In step 210, the method 200 ends. Through use of the method 200, a processor 110 coupled to an interconnect 112 employing a PCIe protocol (e.g., a modified version thereof) may issue a synchronization command. As described above, the synchronicommand may improve an overall efficiency of the plurality of processors 102, 110 of the system 110 by making each processor 102, 110 aware of functions performed by one or more remaining processors 102, 110 of the system 100. Thus, the present invention may enable accelerator logic connected to the second interconnect 112 employing the modified PCIe protocol to issue a synchronization command. The system 100 may enable such functionality by making a small amount of changes to existing PCIe protocol. As described above, existing PCIe may be modified to include and/or recognize a synchronization mechanism for processors, such as accelerators. Thus, the present methods and apparatus may enable one or more platform accelerators to be plugged into the PCI fabric (e.g., coupled to an interconnect employing the modified PCIe protocol). A conventional PCI protocol may only support read and write operations from a processor coupled thereto. However, such conventional PCI protocol does not support a synchronization command from a processor coupled thereto. In contrast, the present invention provides a modified version of the PCIe protocol that supports (e.g., enables) functions required by a synchronization command (e.g., a read-modify-write command). As described above, the modified PCIe protocol includes a new transaction type to recognize a synchronization command. Further, the modified PCIe protocol may include one or more new completion status encodes. Command processing logic 108 (e.g., accelerator agent) may perform processing associated with the synchronization command (e.g., an atomic read-modify-write operation). Thus, only a completion status encode may be transmitted from the command processing logic 108 to the second interconnect 112. In this manner, the second interconnect 112 may avoid supporting a combined read-write command. As described above, a synchronization command may enable processors (e.g., accelerator logic) included in a system to perform better.

Because an interconnect employing conventional PCIe protocol is a non-coherent interconnect, synchronization instructions or techniques that enable processors (e.g., having architectures that support multiprocessors) to access shared data in a cooperative way such as locking algorithms, semaphores and/or the like mechanisms may not be employed by processors coupled to the second interconnect 112. Further, PCIe may support a producer-consumer protocol for processors and I/O devices to sequentially use shared data. However, such support is meant for or provides more coarsely-grained cooperation. To allow more efficient cooperation on computations at a finer-grained basis, a more efficient synchronization mechanism is needed. Thus, by modifying a conventional PCIe protocol as described above, the present methods and apparatus may provide a synchronization method for one or more processors coupled to the interconnect employing the modified PCIe protocol. Further, the extension to the PCIe protocol provided by the present methods and apparatus may be compatible with existing processor instruction sets. Therefore, a central processor unit (CPU) using such an instruction and accelerator logic coupled to an interconnect employing the modified PCIe protocol may synchronize their use of shared memory locations. The minimal extension to the PCIe protocol provided by the present invention may enable a processor coupled to an interconnect employing the modified PCIe protocol to issue commands available to existing processor architectures (e.g., to processors coupled to an interconnect employing an existing interconnect protocol). Such commands may include a compare-and-exchange instruction, a test-and-set instruction, an atomic add instruction, an atomic increment instruction and/or the like. Such commands may also include more primitive capabilities.

Further, as described above, the accelerator logic may improve efficiency with which one or more special functions (e.g., encryption) may be performed by the system 100. By performing much of the processing associated with a synchronization command issued by the second processor 110, the command processing logic 108 may reduce the processing burden on the second processor 110. For example, the command processing logic 108 may perform a data read, modification and/or write associated with the synchronization command. The command processing logic 108 may perform such operations without transmitting data (e.g., data read from memory 104) to the second interconnect 112. Thus, the system 100 may be adapted to efficiently process a synchronization command.

The foregoing description discloses only exemplary embodiments of the invention. Modifications of the above disclosed apparatus and methods which fall within the scope of the invention will be readily apparent to those of ordinary skill in the art. For instance, synchronization of a main processor and accelerator logic coupled to an interconnect 112 employing a modified version of the PCIe protocol is described above. However, the present methods and apparatus may include synchronization of a plurality of accelerator logic coupled to the interconnect 112.

Accordingly, while the present invention has been disclosed in connection with exemplary embodiments thereof, it should be understood that other embodiments may fall within the spirit and scope of the invention, as defined by the following claims.

The invention claimed is:

1. A method of synchronizing a plurality of processors of a system, comprising:
   modifying a peripheral component interconnect express (PCIe) protocol to include a completion status encode associated with a synchronization command that indicates whether a condition of the synchronization command is met;
   providing a system including:
      a memory;
      a first processor coupled to the memory;
      a second processor; and
      an interconnect coupling the second processor to the first processor and the memory; and
   employing the modified PCIe protocol on the interconnect.

2. The method of claim 1 further comprising employing the second processor to perform the synchronization command.

3. The method of claim 2 wherein:
   the system further includes command processing logic coupled to the memory and the interconnect; and
   employing the second processor to perform the synchronization command includes:
      issuing the synchronization command on the interconnect;
      based on the synchronization command, employing the command processing logic to read data from the memory, modify the read data, and write the modified data to the memory; and
      receiving a first completion status encode in the second processor.

4. The method of claim 3 further comprising processing a command subsequent to the synchronization command based on the first completion status encode.

5. The method of claim 3 wherein the data read from the memory by the command processing logic is not transmitted to the second processor.

6. The method of claim 1 wherein the synchronization command is an indivisible combined command to read data from the memory, modify the read data, and write the modified data to the memory such that between the read and write no other processor may access a same memory location with an equivalent indivisible command or may write the same memory location.

7. The method of claim 1 further comprising modifying the PCIe protocol to include a transaction type corresponding to the synchronization command.

8. An apparatus for synchronizing a plurality of processors of a system, comprising:
   an interconnect adapted to couple to a first processor and a memory;
   a second processor coupled to the interconnect;
   wherein the interconnect employs a modified version of a peripheral component interconnect express (PCIe) protocol that includes a completion status encode associated with a synchronization command indicating whether a condition of the synchronization command is met.

9. The apparatus of claim 8 wherein the second processor is adapted to perform the synchronization command.

10. The apparatus of claim 9 further comprising command processing logic coupled to the memory and the interconnect;
   wherein the apparatus is adapted to:
      issue the synchronization command from the second processor on the interconnect;
      based on the synchronization command, employ the command processing logic to read data from the memory, modify the read data, and write the modified data to the memory; and
      receive a first completion status encode in the second processor.

11. The apparatus of claim 10 wherein the apparatus is further adapted to process a command subsequent to the synchronization command based on the first completion status encode.

12. The apparatus of claim 10 wherein the data read from the memory by the command processing logic is not transmitted to the second processor.

13. The apparatus of claim 8 wherein the synchronization command is an indivisible combined command to read data from the memory, modify the read data, and write the modified data to the memory such that between the read and write no other processor may access a same memory location with an equivalent indivisible command or may write the same memory location.

14. The apparatus of claim 8 wherein the modified version of the PCIe protocol further includes a transaction type corresponding to the synchronization command.

15. A system for synchronizing a plurality of processors of a system, comprising:
   a memory;
   a first processor coupled to the memory;
   a second processor; and
   an interconnect coupling the second processor to the first processor and the memory;
   wherein the interconnect employs a modified version of a peripheral component interconnect express (PCIe) protocol that includes a completion status encode associated with a synchronization command indicating whether a condition of the synchronization command is met.

16. The system of claim 15 wherein the second processor is adapted to perform the synchronization command.

17. The system of claim 16 further comprising command processing logic coupled to the memory and the interconnect;
   wherein the system is adapted to:
      issue the synchronization command from the second processor on the interconnect;
      based on the synchronization command, employ the command processing logic to read data from the memory, modify the read data, and write the modified data to the memory; and
      receive a first completion status encode in the second processor.

18. The system of claim 17 wherein the system is further adapted to process a command subsequent to the synchronization command based on the first completion status encode.

19. The system of claim 17 wherein the data read from the memory by the command processing logic is not transmitted to the second processor.

20. The system of claim 15 wherein the synchronization command is an indivisible combined command to read data from the memory, modify the read data and write the modified data to the memory such that between the read and write no other processor may access a same memory location with an equivalent indivisible command or may write the same memory location.

21. The system of claim 15 wherein the modified version of the PCIe protocol further includes a transaction type corresponding to the synchronization command.

* * * * *